June 18, 1957 W. L. DUNN 2,796,571
ELECTRIC MOTOR
Filed July 2, 1954
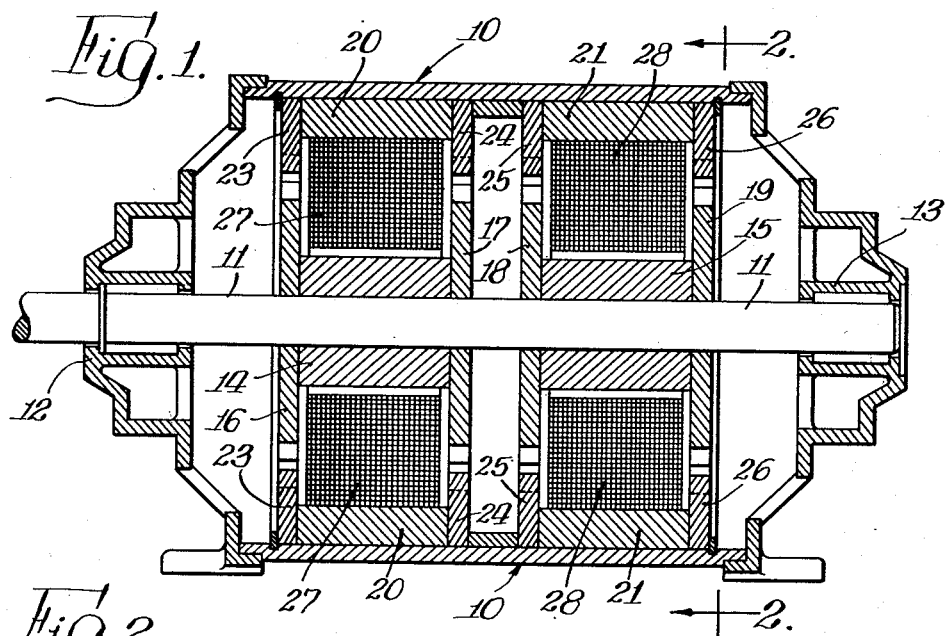
INVENTOR.
William L. Dunn
BY
Mueller & Aichele
Attys.

2,796,571
Patented June 18, 1957

2,796,571
ELECTRIC MOTOR

William L. Dunn, Glenview, Ill., assignor to Magnecord, Inc., Chicago, Ill., a corporation of Illinois Application July 2, 1954, Serial No. 441,136

9 Claims. (Cl. 318—171)

The present invention relates to electric motors and generators, and more particularly to an improved single-phase alternating-current motor.

It is an object of the present invention to provide an improved single-phase alternating-current machine that can be used as a synchronous motor, a variable speed motor, or a variable speed motor synchronized by external synchronizing pulses.

Another object of the invention is to provide such a motor that is relatively simple in its construction and which may be manufactured expeditiously and cheaply.

A feature of the invention is the provision of a motor assembly of inherently simple construction which includes a rotor assembly including at least one disc-like rotor pole piece mounted on the motor shaft, and which further includes a stator assembly including at least one annular stator pole piece mounted in radial alignment with the rotor pole piece in which the rotor pole piece has a series of outwardly extending radial teeth and the stator pole piece has a corresponding series of inwardly extending radial teeth; and in which a permanent magnet is provided in the stator assembly to impart a fixed magnetic polarity to the stator teeth, and a winding is supported by the stator assembly for imparting a reversing polarity to the rotor teeth to provide a driving torque to the motor shaft.

Another feature of the invention is the provision of such a motor assembly in which the components enumerated in the preceding paragraph are duplicated to form two axially spaced units with the respective rotor pole pieces being supported on the common shaft, and with either the rotor pole pieces or the stator pole pieces being displaced angularly one from the other by a selected amount for starting purposes and for other purposes to be described.

The above and other features of the invention which are believed to be new are set forth with particularity in the appended claims. The invention itself, however, together with further objects and advantages thereof may best be understood by reference to the following description when taken in conjunction with the accompanying drawing in which:

Fig. 1 is a sectional elevational view of the improved motor of the present invention;

Fig. 2 is a cross-sectional view of the motor taken along the lines 2—2 of Fig. 1;

Fig. 3 shows an energizing and reversing circuit for the motor; and

Fig. 4 shows a variable speed control circuit for the motor which may be synchronized by an external synchronizing pulse source.

The invention provides an electric motor assembly which comprises a rotatable shaft with first and second cylindrical rotor cores of magnetizable material mounted on the shaft in coaxial relation therewith and spaced axially along the shaft. First and second disc-shaped pole pieces are affixed to the respective ends of the first rotor core in coaxial relation therewith, and third and fourth disc-shaped pole pieces are affixed to the respective ends of the second rotor core coaxially therewith. First and second annular-shaped permanent magnet stator bodies are mounted in coaxial relation with the first and second rotor cores and respectively surround the cores. First and second annular shaped pole pieces are affixed to the respective ends of the first stator body in respective radial alignment with the first and second disc-shaped pole pieces, and third and fourth annular-shaped pole pieces are affixed to the respective ends of the second stator body in respective radial alignment with the third and fourth disc-shaped pole pieces. The disc-shaped pole pieces each have a selected number of outwardly extending radial teeth, and the annular-shaped pole pieces each have a corresponding number of inwardly extending radial teeth. Finally, first and second stationary electric windings are wound within respective ones of the stator bodies and supported thereby in coaxial relation with the rotor cores, the windings being energized by an alternating-current to impart reversing polarity to the teeth of the disc-shaped pole pieces so as to produce a driving torque for the motor shaft.

Referring now to the drawings, and more particularly to Figs. 1 and 2, the improved motor of the present invention includes a housing 10 of generally cylindrical configuration, and the housing supports a shaft 11 which is rotatably mounted in suitable bearings 12, 13. First and second cylindrical rotor cores 14, 15 of magnetizable material are mounted on shaft 11 in coaxial relation therewith and spaced axially along the shaft. Rotor cores 14 and 15 are preferably formed of a ferrite material of high magnetic permeability but low magnetic coercivity, although any other known type of magnetic material exhibiting these properties can be used. A pair of disc-shaped pole pieces 16, 17 of suitable magnetizable material are affixed to the respective ends of core 14 in coaxial relation therewith, and a pair of disc-shaped pole pieces 18, 19 are affixed to the respective ends of core 15 in coaxial relation therewith.

Housing 10 supports a pair of annular shaped permanent magnet stator bodies 20, 21 which are mounted in coaxial relation with the respective rotor cores 14, 15 and respectively surround these cores. The permanent magnet bodies 20, 21 are preferably composed of ferrite material of high specific resistivity and high magnetic retentivity, but any known permanent magnet material can be used. A pair of annular-shaped pole pieces 23, 24 of material exhibiting usual magnetic properties are affixed to the respective ends of stator body 20 in respective radial alignment with pole pieces 16, 17. A pair of annular-shaped pole pieces 25, 26 are affixed to the respective ends of the stator body 21 in respective axial alignment with pole pieces 18, 19. The pole pieces 16, 17 and 18, 19 each have a selected number of outwardly extending radial teeth, and the annular pole pieces 23, 24 and 25, 26 each have a corresponding number of inwardly extending radial teeth.

A pair of stationary electric windings 27, 28 are supported by the respective annular bodies 20, 21 to surround the respective rotor cores 14, 15. When these windings are energized, the current flow therethrough produces magnetization in the rotor cores and in the pole pieces associated therewith. For example, should coil 27 be energized by an alternating-current, the teeth of the rotor pole pieces 16, 17 are alternately magnetized as north and south poles at a repetition rate corresponding to the frequency of the exciting signal. That is, during one half cycle of the exciting signal, the teeth of pole piece 16 will exhibit north poles and the teeth of pole piece 17 will exhibit south poles; and during the next half cycle the polarity will be reversed. The teeth of the stator pole pieces 23, 24, however, each exhibit a fixed polarity due to the permanent magnet body 20 which is magnetized in a longitudinal direction so that the teeth of pole piece 23, for example, each exhibits a north pole and the teeth of pole piece 24, for example, each exhibits a south pole. It is apparent that the teeth of the rotor pole pieces 16, 17 will thus be alternately attracted and repelled by the teeth of the stator pole pieces causing the motor shaft 11 to rotate. It is also apparent, that when the rotor brought up to synchronous speed, that is the speed at which it advances one full tooth for each cycle of the alternating-current exciting current, the motor will rotate at a speed synchronized with the frequency of the exciting current and function as a synchronous motor.

The second assembly is mounted on the motor shaft 11 to assure that the motor will start upon the initial application of the exciting current, and that it will be brought up to synchronous speed. As previously noted, rotor pole pieces 18 and 19 are similar to pole pieces 16, 17. However, the pole pieces 18, 19 are displaced angularly on shaft 11 by an amount just under 90 magnetic degrees with respect to pole pieces 16, 17. That is, the pole pieces 18, 19 are positioned on the shaft so that their teeth are mis-aligned with the teeth of pole pieces 16, 17; with the teeth of pole pieces 18, 19 extending just under half-way across the spaces between the teeth of pole pieces, 16, 17. The exciting current supplied to winding 28 is advanced by a phase displacement just under 90° with respect to the current supplied to winding 27, and the phase between the exciting currents supplied to the respective windings corresponds to the angular displacement of the pole pieces 18, 19 with respect to the pole pieces 16, 17. It will be evident as the description proceeds that instead of displacing the rotor pole pieces 18, 19 with respect to rotor pole pieces 16, 17, the same effect can be obtained by a similar angular displacement of the stator pole pieces 25, 26 with respect to the stator pole pieces 23, 24.

With the arrangement described above, the application of the exciting currents to the windings 27, 28 causes the shaft 11 to rotate and quickly to accelerate to the synchronous speed, regardless of the position of rest the rotor pole pieces might happen to be in when the exciting current is applied to the windings. This obtains because even though the motor may stop at a relative position between the teeth of pole pieces 16, 17 and 23, 24 of zero torque to the motor shaft; this same position is such that maximum torque is produced by the pole pieces 18, 19 and 25, 26. The phase shifts between the currents supplied to the respective windings 27, 28 causes each section of the motor assembly to contribute substantially maximum torque to the motor shaft when the motor is energized.

In order to reverse the motor, it is merely necessary to interchange the application of the exciting current to windings 27, 28. As shown in Fig. 3, the exciting current from input terminals 30 is impressed on windings 27, 28 through a capacitor 31 and through a reversing switch 32 so that inphase current may flow through one winding and near-quadrature current may flow through the other. When the reversing switch is in one position, the near quadrature current flows through coil 28 and the motor reaches synchronous speed in one direction of rotation. On the other hand, when the reversing switch is in its other position, the near-quadrature current flows through winding 27, and the motor accelerates to its synchronous speed in the other direction.

As noted previously herein, the motor is also adapted to variable and synchronized speed control and a circuit for effectuating such a control is shown in Fig. 4. In that circuit, the motor is included in the feedback path of an electronic circuit and constitutes a mechanical feedback coupling to sustain oscillation in that circuit. It should be noted that the particular circuit illustrated in Fig. 4 merely represents a typical circuit, and that the same control can be obtained by any type of electronic circuit capable of producing self-sustaining oscillations, that is, vacuum tube circuits, transistor circuits, magnetic amplifier circuits, or the like.

The circuit shown in Fig. 4 includes a pair of electron discharge devices 35, 36. The anodes of these devices are coupled together through the winding 28 of the motor, and a center tap is taken from that winding and connected to the positive terminal of a unidirectional potential source 37. The negative terminal of that source is connected through a switch 38 to the cathodes of device 35, 36 and to a point of reference potential or ground. The control electrodes of devices 35, 36 are coupled together through the winding 27 of the motor, and winding 27 is shunted by a series of capacitors 39, 39a, 39b, 39c which are selected and successively connected into the circuit by a selecting switch 40. A center tap is taken from winding 27 and is connected through a pair of series resistors 41, 42 to the point of reference potential, resistor 41 being shunted by a capacitor 43 to form a self-biasing network for devices 35, 36. A pair of input terminals 44 are connected respectively to the junction of resistors 41, 42 and to the point of reference potential.

Closure of switch 38 places an exciting potential on the anodes of devices 36, and this produces a current flow through winding 28. The flow of current through winding 28 causes the motor to start which, in turn, causes winding 27 to generate a sine wave that is impressed in push-pull manner on the control electrodes of devices 35, 36. This sine wave causes network 41, 43 to establish a desired operating bias on disharge devices 35, 36 and keys the discharge devices on and off alternately and causes them to commutate the current in winding 28, so that the motor accelerates in the same manner as a two-pole shunt direct-current motor. The acceleration of the motor continues until its speed is such that the signal generated by winding 27 has a frequency corresponding to the resonant frequency of the parallel resonant network formed by winding 27 and the shunting capacitor selected by switch 40. The motor accelerates up to this resonant speed and holds this speed since any further acceleration produces a capacitive phase shift across the resonant network rather than an inductive phase shift. The capacitive phase shift changes the timing of commutation of the current in winding 28 by discharge devices 35, 36; and this produces a phase relation in the circuit that tends to decelerate the motor back to the resonant speed.

It is evident that the resonant speed of the motor can be varied merely by adjusting switch 40, so that different value capacitors are selected thereby changing the resonant frequency of the circuit formed by the selected capacitors and winding 27. Moreover, the speed of the motor can be synchronized by an external source of synchronizing pulses. When such synchronizing pulses are impressed with positive polarity across terminals 44, they cooperate with the sine wave in winding 27 to key the devices 35, 36 in alternation and lock the frequency of the motor control circuit to the repetition frequency thereof, assuming that the free-running frequency of the control circuit is slightly greater than the repetition frequency of the synchronizing pulses.

The invention provides, therefore, an improved and simplified reversible motor assembly that is capable of synchronous operation, and which may also be controlled for variable speed and which may be synchronized with an external source. As previously noted, it is preferred that the magnetic circuit of the motor be composed of ferrites. Even though ferrites do not have as good magnetic characteristics as the magnetic steel that is usually used in motors, the disadvantage in this respect is largely offset by the fact that the hysteresis and eddy current losses in a motor constructed of ferrite material are virtually negligible, so that the only appreciable losses in the motor are copper losses plus losses due to windage and friction. The choice of ferrites is also preferable due to the cylindrical construction of the magnetic circuit and the resulting necessity for high specific resistivity in the magnetic materials.

It is to be noted that the synchronous speed of the motor is equal the frequency of the exciting current divided by the number of teeth on the pole pieces 16, 17, 18, 19, 23, 24 and 25, 26. When so desired the stator assemblies 20, 23, 24 and 21, 25, 26 can be mounted so as to be mechanically rotatable with respect to one another. With such an arrangement, the motor may be reversed through the simple process of mechanically shifting one assembly by approximately one half of the tooth spacing.

While a particular embodiment of the invention has been shown and described, modifications may be made and it is intended in the appended claims to cover all such modificaitons as fall within the true spirit and scope of the invention.

I claim:

1. An electric assembly including in combination, a rotatable shaft, a cylindrical rotor core of magnetizable material mounted coaxially on said shaft including a pair of disc-shaped pole pieces affixed to said shaft in spaced relation, a stator body including an annular-shaped permanent magnet mounted coaxially with said core and surrounding said core, a pair of annular-shaped pole pieces for said stator body magnetized by said annular-shaped permanent magnet and positioned adjacent the respective ends thereof and in respective radial alignment with said disc-shaped pole pieces, said disc-shaped pole pieces each having a selected number of outwardly extending radial teeth and said annular-shaped pole pieces each having a corresponding number of inwardly extending radial teeth, and a stationary electric winding adapted to be energized by an alternating current signal and being wound within said stator body in coaxial relation with said rotor core and surrounding said core so that said disc shaped pole pieces are magnetized by said stationary electric winding to produce alternate magnetization thereof for reaction with said annular-shaped pole pieces to cause rotation of said rotor core.

2. An electric assembly including in combination, a rotatable shaft, rotor means including at least a pair of disc-shaped rotor pole pieces of magnetizable material mounted on said shaft in coaxial relation therewith, stator means including at least a pair of annular stator pole pieces of magnetizable material mounted coaxial with said shaft in radial alignment with said rotor pole pieces, said rotor pole pieces having a selected number of outwardly extending radial teeth and said stator pole pieces having a related number of inwardly extending radial teeth, permanent magnet means for imparting a unidirectional magnetic polarity to said teeth of said stator pole pieces, and a winding supported by said stator means for imparting a reversing magnetic polarity to said teeth of said rotor pole pieces.

3. An electric motor system including in combination, a rotatable shaft, first and second cylindrical rotor cores of magnetizable material mounted on said shaft in coaxial relation therewith and spaced axially one from the other, a first pair of disc-shaped pole pieces affixed to the respective ends of said first core in coaxial relation therewith, a second pair of disc-shaped pole pieces affixed to the respective ends of said second core in coaxial relation therewith, first and second annular-shaped permanent magnet stator bodies mounted in coaxial relation with said first and second cores and respectively surrounding said cores, a first pair of annular-shaped pole pieces affixed to the respective ends of said first stator body in respective radial alignment with said first pair of disc-shaped pole pieces, a second pair of annular-shaped pole pieces affixed to the respective ends of said second stator body in respective radial alignment with said second pair of disc-shaped pole pieces, said disc-shaped pole pieces each having a selected number of outwardly extending radial teeth and said annular pole-pieces each having a corresponding number of inwardly extending radial teeth, a pair of electron discharge devices each having an anode and a cathode and a control electrode, a first stationary electric winding connected between the anodes of said devices and wound within one of said stator bodies in coaxial relation with said rotor cores and surrounding one of said cores, a second stationary electric winding connected between the control electrodes of said devices and wound within the other of said stator bodies in coaxial relation with said rotor cores and surrounding the other of said cores, means for connecting the cathodes of said devices to a point of reference potential, means for connecting an intermediate point on said first winding to a positive direct current potential source, circuit means for connecting an intermediate point on said second winding to said point of reference potential, and capacitive means connected across said second winding to form a resonant network therewith.

4. The system of claim 3 in which said circuit means includes a resistance-capacity self-biasing network for said discharge devices.

5. The system of claim 3 in which said circuit means includes terminal means adapted to be connected to an external source of synchronizing pulses.

6. The system of claim 3 in which said capacitive means includes a series of capacitors of different values and means for selectively connecting said capacitors across said second winding.

7. An electric motor assembly including in combination, a rotatable shaft, first and second rotor means mounted on said shaft in coaxial relation therewith and spaced axially from one another, said first rotor means including a pair of disc-shaped pole pieces affixed in spaced relation on said shaft in coaxial relation therewith, said second rotor means including a second pair of disc-shaped pole pieces affixed in spaced relation on said shaft in coaxial relation therewith, a stator body including first and second annular shaped permanent magnets mounted in coaxial relation with said first and second core means and respectively surrounding the same, a first pair of annular shaped pole pieces disposed adjacent the respective ends of said first annular shaped permanent magnet in respective radial alignment with said first pair of disc-shaped pole pieces, a second pair of annular shaped pole pieces disposed adjacent the respective ends of said second annular shaped permanent magnet in respective radial alignment with said second pair of disc shaped pole pieces, said first and second pairs of annular shaped pole pieces being magnetized respectively by said first and second annular shaped permanent magnets, said disc shaped pole pieces each having a selected number of outwardly extending radial teeth and said annular shaped pole pieces each having a corresponding number of inwardly extending radial teeth, and first and second stationary electric windings wound respectively within said first and second annular shaped permanent magnets in coaxial relation respectively with said first and second rotor means, said stationary electric windings being adapted to be coupled to a source of alternating current signals and being constructed to alternately magnetize said first and second pairs of disc shaped pole pieces so that the same magnetically react with said annular shaped pole pieces.

8. The motor defined in claim 7 in which one of said first pairs of pole pieces is angularly adjustable with respect to the corresponding one of said second pairs of pole pieces.

9. An electric motor assembly including in combination a rotatable shaft, first and second rotor means mounted on said shaft in coaxial relation therewith and spaced axially from one another, said first rotor means including a first pair of disc shaped pole pieces affixed in spaced relation to said shaft and in coaxial relation therewith, said second rotor means including a second pair of disc shaped pole pieces affixed in spaced relation to said shaft and in coaxial relation therewith and spaced from said first pair of disc shaped pole pieces, a stator body including first and second annular shaped permanent magnets mounted in coaxial relation with said first and second core means and respectively surrounding the same, first and second pairs of annular shaped pole pieces disposed respectively at opposite ends of said first and second annular shaped permanent magnets and individually in respective radial alignment with said first and second pairs of disc shaped pole pieces, and adapted to be magnetized thereby said disc shaped pole pieces each having a selected number of outwardly extending radial teeth and said annular shaped pole pieces each having a corresponding number of inwardly extending radial teeth, first and second stationary electric windings wound respectively within said first and second annular shaped permanent magnets in coaxial relation respectively with said first and second rotor means and adapted to magnetize said disc shaped pole pieces in accordance with signals applied thereto, and adjustable oscillator means coupled to said stationary electric windings in feedback relation therewith to energize said electric windings and magnetize said first and second disc shaped pole pieces.

References Cited in the file of this patent

UNITED STATES PATENTS 2,548,633   Stephenson _____ Apr. 11, 1951